_(12)_ United States Patent
Li et al.

(10) Patent No.: US 9,787,369 B2
(45) Date of Patent: Oct. 10, 2017

(54) COOPERATIVE MULTI-POINT MODULATION (COMP-M) : METHOD AND APPARATUS USING BASE STATION MODULATION WITH COOPERATIVE MULTI-POINT TRANSMITTING AND RECEIVING IN A CELLULAR SYSTEM

(71) Applicants: Shupeng Li, Morristown, NJ (US); David Huo, Morristown, NJ (US); Guang Yang, Beijing (CN); Junfeng Zhang, Shenzhen (CN)

(72) Inventors: Shupeng Li, Morristown, NJ (US); David Huo, Morristown, NJ (US); Guang Yang, Beijing (CN); Junfeng Zhang, Shenzhen (CN)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 0 days.

(21) Appl. No.: 14/373,484

(22) PCT Filed: Nov. 27, 2012

(86) PCT No.: PCT/CN2012/085361
§ 371 (c)(1),
(2) Date: Jul. 21, 2014

(87) PCT Pub. No.: WO2013/107219
PCT Pub. Date: Jul. 25, 2013

(65) Prior Publication Data
US 2015/0010102 A1 Jan. 8, 2015

(30) Foreign Application Priority Data

Jan. 21, 2012 (WO) ................ PCT/CN2012/070707

(51) Int. Cl.
*H04B 7/02* (2006.01)
*H04B 7/024* (2017.01)
(Continued)

(52) U.S. Cl.
CPC ........... *H04B 7/024* (2013.01); *H04L 1/0612* (2013.01); *H04L 5/0035* (2013.01)

(58) Field of Classification Search
CPC ...... H04B 7/04; H04B 7/0465; H04B 7/0469; H04B 7/0478; H04B 7/0617;
(Continued)

(56) References Cited

U.S. PATENT DOCUMENTS 8,058,903 B2 * 11/2011 Zhao et al. ...................... 326/52
9,094,145 B2 * 7/2015 Yue et al. ...................... 370/392
(Continued)

FOREIGN PATENT DOCUMENTS

CN 101789849 A 7/2010
CN 101877887 A 11/2010
(Continued)

OTHER PUBLICATIONS

International Search Report for PCT/CN2012/085361 mailed Mar. 7, 2013.

*Primary Examiner* — Hirdepal Singh
(74) *Attorney, Agent, or Firm* — Drinker Biddle & Reath LLP

(57) ABSTRACT

A Cooperative Multi-point transmitting and receiving apparatuses using base station modulation method in a wireless system are provided.

4 Claims, 4 Drawing Sheets

Modulation Process of an exemplary 4 base station CoMP-M system

(51) Int. Cl.
*H04L 5/00* (2006.01)
*H04L 1/06* (2006.01)

(58) Field of Classification Search
CPC .... H04B 7/0619; H04B 7/024; H04B 7/0639; H04B 7/0452; H04B 7/0456; H04B 7/0486; H04B 7/0626; H04B 17/0045; H04B 17/005; H01L 1/0612; H01L 5/0035
See application file for complete search history.

(56) References Cited

U.S. PATENT DOCUMENTS

| | | | |
|---|---|---|---|
| 2011/0286398 A1* | 11/2011 | Chung et al. | 370/328 |
| 2012/0087265 A1* | 4/2012 | Tamaki et al. | 370/252 |
| 2012/0176939 A1* | 7/2012 | Qu et al. | 370/255 |
| 2012/0188888 A1 | 7/2012 | Wang et al. | |
| 2012/0320774 A1 | 12/2012 | Dai et al. | |
| 2013/0114536 A1* | 5/2013 | Yoon | 370/329 |
| 2013/0235756 A1* | 9/2013 | Seo et al. | 370/252 |
| 2013/0294279 A1* | 11/2013 | Nagata et al. | 370/252 |
| 2014/0051452 A1* | 2/2014 | Dotzler et al. | 455/447 |
| 2014/0064203 A1* | 3/2014 | Seo et al. | 370/329 |

FOREIGN PATENT DOCUMENTS

| | | |
|---|---|---|
| CN | 102142875 A | 8/2011 |
| WO | WO-2011060589 A1 | 5/2011 |

\* cited by examiner

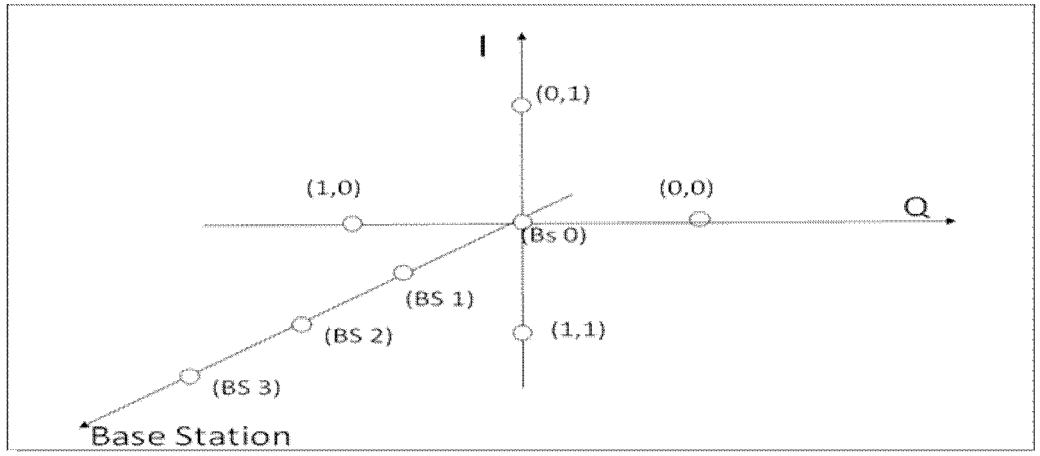
Figure 1  Exemplary constellation of a 4 base station CoMP-M
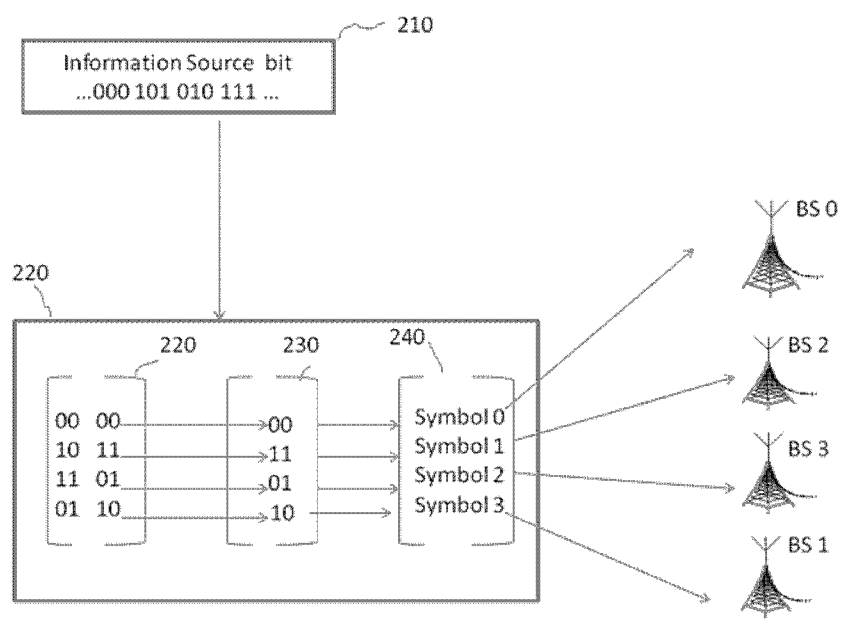
Figure 2  Modulation Process of an exemplary 4 base station CoMP-M system

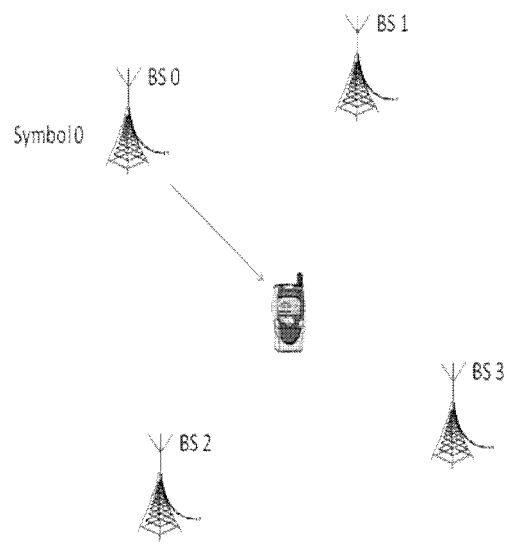
Figure 3 Cooperative multi-point transmission at time instant 0
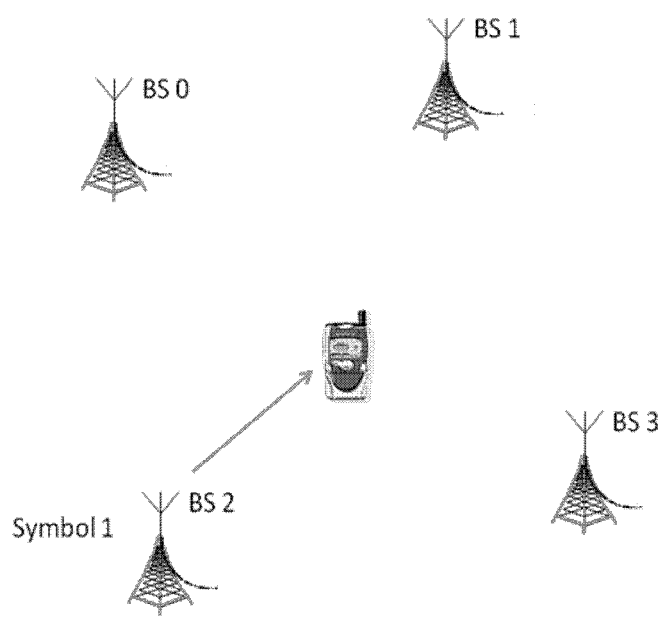
Figure 4 Cooperative multi-point transmission at time instant 1

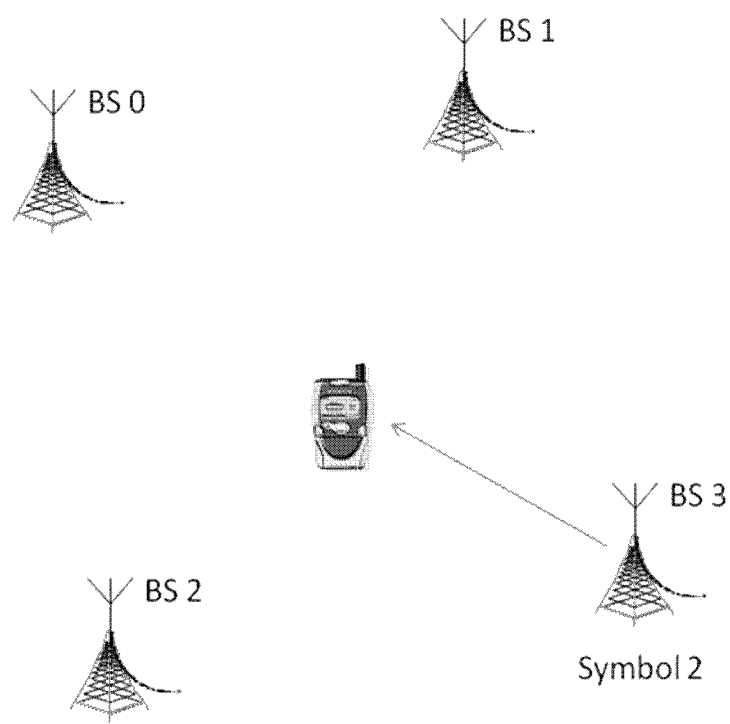
Figure 5 Cooperative multi-point transmission at time instant 2

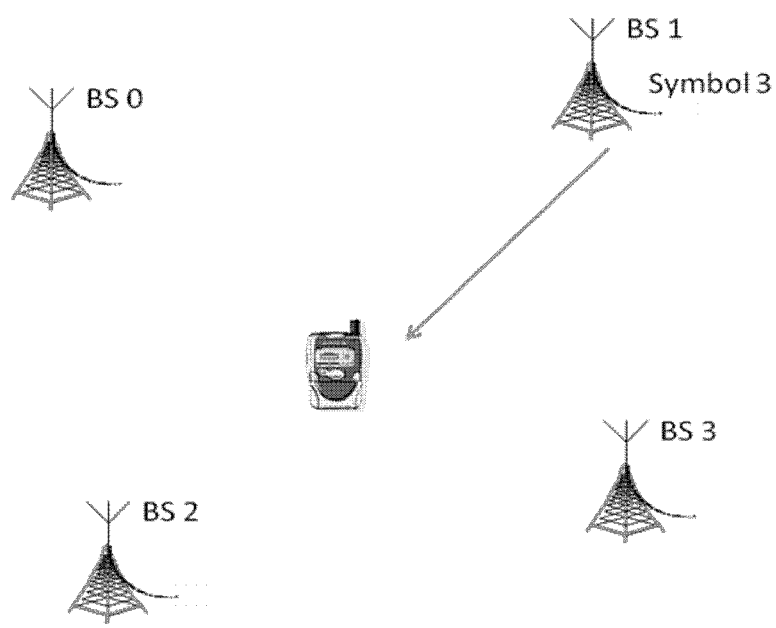
Figure 6 Cooperative multi-point transmission at time instant 3

COOPERATIVE MULTI-POINT MODULATION (COMP-M) : METHOD AND APPARATUS USING BASE STATION MODULATION WITH COOPERATIVE MULTI-POINT TRANSMITTING AND RECEIVING IN A CELLULAR SYSTEM

BACKGROUND OF THE INVENTION

1. Field of the Invention

The present invention relates generally to a modulation method of cooperative transmitting point. Example of cooperative transmitting point can be eNB cell, pico, Femto, or RRH.

2. Description of the Related Art

In order to increase the capacity of the modern radio access systems, Cooperative Multipoint (CoMP) transmission and reception has been proposed. Traditionally, in cellular systems each user is assigned to a base station on the basis of criteria such as down link signal strength. At the terminal side, all the signals coming from the other base stations are deemed as interference, which ultimately limit the capacity. In the uplink, the user terminal (UE) only communicates with only one single serving base station while causing interference to the neighboring base station. Also, each base station processes in-cell users independently, and the rest of the users are seen as inter-cell interference.

With CoMP, several geographically distributed base stations cooperate in the transmission and reception with the aim of reducing interference. Cooperation among these base stations are enabled by the high speed link, such as optical fiber links, between them.

For DL-CoMP, multiple base stations in a CoMP set simultaneous transmitting to the same UE. Multiple-input and Multiple output antenna technologies, such as spatial multiplexing or space time block coding, could be employed.

Usually at terminal side, UE is expected to receive multiple data streams from different base station. There are two scenarios. First, when space time blocking coding is employed, as the rank of the data is 1, relatively simple receiver structure is required thus leading to reduced implementation complexity at the UE side. Admittedly, there is a penalty in the aspect of spectrum efficiency.

To achieve higher spectrum efficiency as compare to spatial time blocking coding, open loop spatial multiplexing is employed. In this case, more complex receiver, such as MMSE receiver is needed at UE side, consequently increasing UE implementation complexity.

There is a need to achieve higher spectrum efficiency in the CoMP system, at the same time keeping a relative low terminal implementation cost. This is especially useful for Machine-to-Machine application where the terminal cost is a major issue.

SUMMARY OF THE INVENTION

To achieve a trade of between spectrum efficiency and UE implementation complexity and terminal cost in cooperative multi-point transmitting and receiving system, base station modulation is introduced. CoMP-M is defined as a CoMP system with base station modulation.

The basic idea of base station modulation is to map a block of information bits into a constellation which has two parts:

1) A symbol that is chosen from a signal-constellation diagram, like QPSK, BPSK, and
2) A unique base station index that is carefully chosen from a set of cooperative multi-point transmission set.

In FIG. 1, an exemplary signal constellation is given.

In FIG. 2, an exemplary CoMP-M modulation process is given. Source Information was equally spitted into sections at the controlling eNB based on the number of cooperative transmitting point decided in the system. In each section, information bit is divided into two parts, the second part, which is called signal part, is used to form a signal constellation such as BPSK, QPSK, 8PSK, the first part, which is called base station modulation section, is used to map the second part into a particular cooperative transmitting point index. In FIG. 2, this is achieved in the base station modulation unit 220. The source information bits in the base station modulation section is mapped into the index of a group of candidate transmitting point in one CoMP set, at unit 230. Various mapping method can be used, such as gray code. At unit 240, information bits in the signal part is mapping to certain signal symbol.

For information bits in the signal parts, further multiple antenna technologies can be applied, for example, spatial time block coding, spatial multiplexing, etc.

At the time when the information is conveyed to the terminal, only one cooperative transmitting point is active at one time instant. The active transmitting point is chosen based on output of the base station modulation unit 220. FIGS. 3, 4, 5, and 6 depict the actual transmission situation during time instant 0, time instant 1, time instate 2, and time instant 3.

The invention claimed is:

1. A cooperative multi-point (CoMP) transmitting and receiving system with base station (CoMP-M) method, in a wireless system the method comprising:
    receiving a signal with a plurality of bits and separating the received signal into a base station index bit section and a signal modulation bit section;
    encoding the signal modulation bit section with a certain signal modulation scheme; and
    encoding the base station index bit block with an index of an base station which will be used to transmit the signal,
    wherein the separating of the received signal comprises separating log 2 (total number of base stations in a cooperative multi-point processing set (CoMP) set) bits of the received signal as the base station bit section and separating log 2 (total number of all possible cases represented by a signal modulation constellation) bits of the received signal as the signal modulation bit section.

2. The CoMP-M modulation method of claim 1, wherein the encoding of the cooperative transmitting point index bit section comprises setting a symbol at a position corresponding to an inactive cooperative transmitting point in the vector signal to 0.

3. A cooperative multi-point (CoMP) transmitting and receiving system with base station (CoMP-M) method, in a wireless system the method comprising:
    receiving a signal with a plurality of bits and separating the received signal into a base station index bit section and a signal modulation bit section;
    encoding the signal modulation bit section with a certain signal modulation scheme; and
    encoding the base station index bit block with an index of an base station which will be used to transmit the signal, where in the encoding of the base station modulation section of the source signal, comprises generating a vector signal with as many symbols as a total number of cooperative transmitting point selected in a COMP set; and encoding a symbol at a position corresponding to the index of the cooperative transmitting point to be activated in the vector signal to a signal modulation symbol value.

4. The CoMP-M modulation method of claim 3, wherein the encoding of the cooperative transmitting point index bit section comprises setting a symbol at a position corresponding to an inactive cooperative transmitting point in the vector signal to 0.

* * * * *